United States Patent [19]

Greiner et al.

[11] 4,112,278

[45] Sep. 5, 1978

[54] PUSH BUTTON SWITCH

[75] Inventors: Günter Greiner, Bayreuth; Günter Murmann, Neuses, both of Fed. Rep. of Germany

[73] Assignee: Cherry Electrical Products Corp., Waukegan, Ill.

[21] Appl. No.: 845,489

[22] Filed: Oct. 26, 1977

[30] Foreign Application Priority Data

Nov. 23, 1976 [DE] Fed. Rep. of Germany ....... 2653172

[51] Int. Cl.² ...................... H01H 3/34; H01H 13/58
[52] U.S. Cl. ...................... 200/156; 74/143; 74/575; 200/11 TW; 200/308
[58] Field of Search ............. 200/64, 156, 308, 11 R, 200/11 TW, 17 R, 17 B; 74/143, 575, 576, 577 M, 578; 335/140

[56] References Cited

U.S. PATENT DOCUMENTS

| | | | |
|---|---|---|---|
| 3,184,982 | 5/1965 | Auer | 74/143 |
| 3,375,337 | 3/1968 | Barrett et al. | 335/140 X |
| 3,435,167 | 3/1969 | Pfleger | 200/156 |
| 3,501,969 | 3/1970 | Burwell et al. | 74/143 |
| 3,626,452 | 12/1971 | Winter et al. | 74/575 X |
| 3,748,915 | 7/1973 | Winter et al. | 74/143 X |
| 3,852,554 | 12/1974 | Heide | 200/156 |
| 3,876,848 | 4/1975 | Hartmann | 200/156 |

*Primary Examiner*—Stephen Marcus
*Attorney, Agent, or Firm*—Edward C. Threedy

[57] ABSTRACT

A push-button rotary switch having a switching mechanism including a pair of independent actuators having linear movement into contact with the teeth of a switch position selector ratchet wheel mounted at the center of a rotatable switch-positioning indicator, with the actuators adapted to alternately engage certain of the ratchet teeth so as to rotate the switch-positioning indicator step by step in either direction into different switching positions.

7 Claims, 2 Drawing Figures

PUSH BUTTON SWITCH

SUMMARY OF THE INVENTION

Push-button switches of the known prior art normally require the actuators to be deflected out of their longitudinal plane during their linear path of reciprocating actuating movement, to rotate the switch into different switching positions. The deflection is caused by the continuous engagement of part of the actuators with the teeth of the rotatable ratchet wheel as the same is caused to rotate in either direction. The continuous deflection of the actuators tends to inherently weaken the same, resulting in adverse operation condition of the same with respect to the ratchet wheel, and thereby causing the malfunction of the switch. The prior art structures also require close tolerances to be maintained between the actuators and the ratchet wheel to achieve proper operation of the switch.

The present invention overcomes these problems, as well as providing a push-button rotary switch that provides a resulting tactile feel for the switch actuator as it is moved from one switching position to another.

To achieve the objects of the present invention, there is provided a pair of actuators which comprise elongated flat plates having an uninterrupted surface on one side and providing a substantially C-shaped reinforcing area on the opposite side. The uninterrupted flat surface on one side of the actuator has flush facial contact with one side wall of the housing so as to prevent any tiltable movement of the actuator during its reciprocal movement. The C-shaped reinforcing area provides positive actuating cams and stop cams, each of which are related to one another and to the corresponding components of the other actuator for achieving positive rotation and final positioning of the switching member during actuation of the switch. The actuators are provided with guiding means which cooperates with the uninterrupted flat surface for preventing tilting or deflection of the actuator as it is operated. The construction of the present switch readily adapts itself to miniaturization while maintaining the specific performances of all of the components thereof.

GENERAL DESCRIPTION

The advantages and the features of the present invention are shown in the accompanying drawings which illustrate a preferred form of construction, and in which.

GENERAL DESCRIPTION

Figure 1:
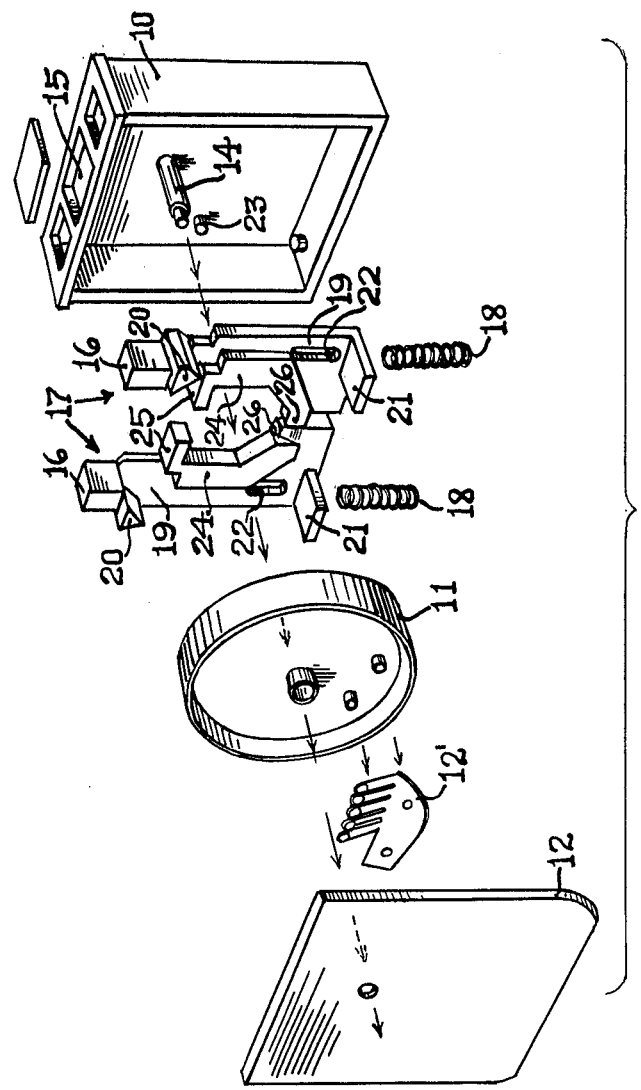
FIG. 1 is a perspective exploded view of the components of the switch.

According to the present invention, the push-button actuated switch consists of an open-sided housing 10 in which a switch wheel 11 and stepping mechanisms therefor are stored.

Adapted to close the open side of the housing 10 is a printed circuit board 12. The printed circuits are contained on the inner surface of the board 12 and are adapted to be engaged by a set of yieldable spring fingers 12' mounted upon the confronting side surface of the switch wheel 11.

Mounted upon the opposite side surface of the switch wheel 11 is a ratchet wheel 13. The switch wheel 11 and ratchet wheel 13 are rotatably mounted upon a fixed shaft 14. The switch wheel 11 is positioned upon the shaft 14 so as to be in alignment with a visual opening 15 formed in the front wall of the housing 10. The peripheral edge of the switch wheel 11 will bear indicia corresponding to the various switching positions of the switch fingers 12' relative to the circuits on the printed circuit board 12, which positions are then visible through the opening 15. To either side of the visual opening 15 are apertures through which project one end of the actuators 16 of the stepping mechanisms 17.

The actuators 16 are yieldably projected through the apertures formed in the front wall of the housing 10 by compression springs 18 which are positioned within the housing 10 and have one end bearing against the rear wall of the housing 10 and their opposite end bearing against lateral flanges 21 formed at the inner end of the actuators 16. Each of the actuators 16 within the housing 10 is provided with enlarged reinforcement members 20 having sufficient size so as to engage the inner surfaces of the side wall of the housing and the inner surface of the printed circuit board 12 when the latter is mounted in closed position on the housing 10. It should be noted that the reinforcement members 20 are of a width equal to the length of the lateral flanges 21, such that these elements will prevent tilting of the actuators 16 out of their longitudinal plane as they are reciprocally moved within the housing 10.

Figure 2:
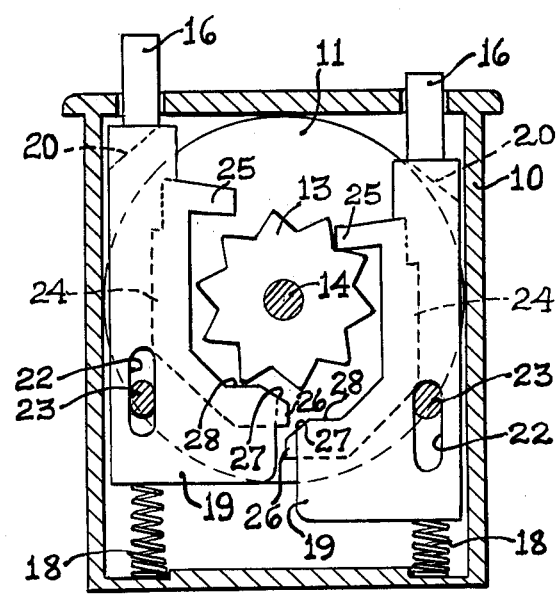
FIG. 2 is a plan view of the switch in an intermediate switching position.

Each of the actuators 16 is constructed similarly and mirrorlike and consists of an elongated flat plate 19 extending between its lateral flange 21 and its reinforcing member 20. The flat plates 19 each have formed therein adjacent the lateral flanges 21, elongated openings 22 through which project fixed guide pins 23 carried by the side wall of the housing 10 and which project parallel to the shaft 14 as shown in FIGS. 1 and 2. The flat plates 19 of each of the actuators 16 are adapted to bear upon the inner surface of the side wall of the housing 10 when mounted within the housing, as shown. The exposed surface of each of the flat plates 19 is provided with an enlarged substantially C-shaped reinforcement area 24. One end of the C-shaped member 24 provides an actuating cam 25, while the opposite end of such member provides a stop cam 26. The C-shaped members 24 of each of the actuators 16 will lie on opposite sides of a diameter line drawn through the ratchet wheel 13 and shaft 14, as shown in FIG. 2. It should be noted that the actuating cams 25 are angularly positioned with respect to each other and with respect to the ratchet wheel 13. The stop cams 26 each provide oppositely disposed inclined surfaces 27 and flat surfaces 28, the purposes and functions of which are hereinafter explained. The stop cams 26 are also formed so as to provide oppositely beveled ends that dovetail with each other when said actuators are in an unactuated position.

The operational method of the push-button rotary switch is given in the following description.

Reference is made to FIG. 2, where the switch as illustrated is in an intermediate phase of the step-by-step rotational action of the ratchet wheel 13.

The right-hand actuator 16 has been depressed such that its actuating cam 25 has engaged and partially rotated a tooth of the ratchet wheel 13, while at the same time such right-hand actuator 16 has its stop cam 26 disengaged from the teeth on the opposite side of the ratchet wheel 13, as shown. By this movement of the actuator 16, rotation of the ratchet wheel 13 upon the shaft 14 is achieved. By reason of the rotation of the ratchet wheel 13, a tooth on the opposite side thereof from that which has been engaged by the actuator cam 25 of the right-hand actuator 16, will engage and ride upon the inclined surface 27 of the stop cam 26 of the left-hand actuator 16, causing the same to move inwardly of the housing 10 and to slightly compress against its spring 18, as shown.

By the release of the depressing pressure upon the right-hand actuator 16, it, as well as the left-hand actuator 16, will, under the expansion pressure of their respective springs 18, tend to return to their normal raised position. During this movement, the flat surface 28 on the stop cam 26 of the left-hand actuator 16 will simultaneously with the release of the actuating cam 25 of the actuator 16 from the teeth of the ratchet wheel 13, cause the ratchet wheel to continue to rotate until the inclined surfaces 27 of each of the stop cams 26 of each of the actuators 16 engage opposite side surfaces of a single tooth of the ratchet wheel. At this time the ratchet wheel 13 together with the switch wheel 11 has been moved into a new switch position and will be held there, against further movement.

The forced return of the actuators 16 under their respective springs 18 will produce a noticeable force reaction through the exposed ends of the actuators 16, giving to the switch actuator a tactile feel which will indicate the completion of the switching operation. This tactile feel makes a visual observation of the switch position practically unnecessary and aids in conjunction therewith to inform the operator that a new switch position has been achieved.

Upon the desired rotation of the ratchet wheel 13 in an opposite direction, the corresponding parts of each of the actuators 16 perform in the manner hereinbefore described to achieve the same result.

While we have illustrated and described the preferred form of construction for carrying our invention into effect, this is capable of variation and mofification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. In a multiple-position push-button rotary switch having switch contacts movable in either direction through a plurality of switch positions and housed within an open-sided hollow case, the combination comprising
   (a) a rotatable ratchet wheel carried by a switch position indicator mounted for rotation within the switch housing,
   (b) a pair of independent actuators diametrically disposed on opposite sides of the axis of said ratchet wheel and mounted for independent reciprocal linear movement within said housing into and out of tangential contact with said ratchet wheel,
   (c) each of said actuators providing an elongated flat plate having an uninterrupted surface on one side thereof for facial displacement against one side wall of said housing, and a substantially C-shaped reinforcing area on the opposite side surface,
   (d) said C-shaped reinforcing area providing at one end thereof an actuating cam and at the opposite end a stop cam adapted to be alternately engageable with said ratchet wheel to rotate the same in step-by-step movement in either direction, and
   (e) yieldable means for maintaining said actuators in one position with their respective stop cams in engagement with certain teeth of said ratchet wheel to maintain the same in a set switching position.

2. In a multiple-position push-button rotary switch as defined by claim 1, wherein said yieldable means for maintaining said actuators in one position comprises coil springs disposed between a portion of said housing and one end of each of said actuators.

3. In a multiple-position push-button rotary switch as defined by claim 1, including means carried by said one side wall of said housing cooperating with means provided by said flat plate of said actuators for guiding said actuators through their linear path relative to said ratchet wheel.

4. In a multiple-position push-button rotary switch as defined by claim 2, including means carried by said one side wall of said housing cooperating with means provided by said flat plate of said actuators for guiding said actuators through their linear path relative to said ratchet wheel.

5. In a multiple-position push-button rotary switch as defined by claim 1, wherein said actuating cams and said stop cams on said actuators are rigid angularly disposed end portions adapted to be moved tangentially with respect to said ratchet wheel, with each actuator having cooperative movement to complete a step-by-step rotation of said ratchet wheel in either direction.

6. In a multiple-position push-button rotary switch as defined by claim 3, wherein said actuating cams and said stop cams on said actuators are rigid angularly disposed end portions adapted to be moved tangentially with respect to said ratchet wheel, with each actuator having cooperative movement to complete a step-by-step rotation of said ratchet wheel in either direction.

7. In a multiple-position push-button rotary switch as defined by claim 4, wherein said actuating cams and said stop cams on said actuators are rigid angularly disposed end portions adapted to be moved tangentially with respect to said ratchet wheel, with each actuator having cooperative movement to complete a step-by-step rotation of said ratchet wheel in either direction.

* * * * *